United States Patent [19]
Carpinella

[11] Patent Number: 5,686,700
[45] Date of Patent: Nov. 11, 1997

[54] ADJUSTABLE CABLE MANAGEMENT GROMMET

[75] Inventor: Henry J. Carpinella, Waterbury, Conn.

[73] Assignee: Carpin Manufacturing, Inc., Waterbury, Conn.

[21] Appl. No.: 339,008

[22] Filed: Nov. 14, 1994

[51] Int. Cl.$^6$ .................................................. H02G 3/18
[52] U.S. Cl. .................... 174/65 R; 220/253; 312/223.6
[58] Field of Search .......................... 174/48, 65 R, 174/65 G, 66, 67, 135, 152 G; 220/253, 255, 307, DIG. 19, DIG. 21; 312/223.6, 223.3; 108/50; 52/220.8, 36.1, 36.4; 16/2

[56] References Cited

U.S. PATENT DOCUMENTS

| | | | |
|---|---|---|---|
| D. 285,044 | 8/1996 | Mockett | D8/354 |
| 995,203 | 6/1911 | Thomas et al. | 174/152 G X |
| 2,663,895 | 12/1953 | Petri | 16/2 |
| 3,141,062 | 7/1964 | Rapata | 16/2 X |
| 4,002,821 | 1/1977 | Satoh et al. | 16/2 X |
| 4,262,166 | 4/1981 | Radzishevsky et al. | 174/65 R |
| 4,385,504 | 5/1983 | Perrone et al. | 174/65 R X |
| 4,688,491 | 8/1987 | Herrera et al. | |
| 4,730,363 | 3/1988 | Asbaghi | |
| 4,808,774 | 2/1989 | Crane | |
| 4,950,839 | 8/1990 | Quinn et al. | |
| 5,167,047 | 12/1992 | Plumley | |
| 5,167,338 | 12/1992 | Kick | 220/253 |

*Primary Examiner*—Hyung S. Sough
*Assistant Examiner*—Dean A. Reichard
*Attorney, Agent, or Firm*—Chilton, Alix & Van Kirk

[57] ABSTRACT

An adjustable management grommet for routing cables, wires, and the like, through a surface having an integrally formed body with a cylindrical shell and a planar wall at one end thereof, and an integrally formed circular cover rotatably mounted in snap fit fashion at the center of the wall of the body. Both the wall of the body and the cover have sector-shaped apertures which can be aligned by rotating the cover to define an adjustable opening for easy installation and removal of plugged cabling. Detents projecting from the cover successively engage dimples on the wall of the body as the cover is rotated to define a plurality of discrete opening sizes to snugly accommodate installed cabling.

11 Claims, 4 Drawing Sheets

ADJUSTABLE CABLE MANAGEMENT GROMMET

BACKGROUND OF THE INVENTION

The present invention relates to cable management grommets of the type used to route cables, wires, and the like, through substantially planar surfaces such as desktops or tabletops.

With the widespread increase in the use of electronic office equipment, such as telephones, dictaphones and computers, there has developed a corresponding need to organize and route the wiring for such equipment off of desktops, and other furniture, to the usual electrical outlets. Thus, furniture manufacturers have had to modify the design of their products to accommodate the need for an increasing number of wires and fiber optic cables (hereinafter variously referred to as "cables", "cabling", "wires" or "wiring") associated with such electronic equipment. The most basic modification in furniture design is to provide a hole near one corner of a desktop, tabletop, or some other working surface, through which cabling can be routed. However, while being effective for passing plugged cables, simply providing a hole in a desktop is unsightly and provides an excessively large opening through which small objects, such as paper clips, pencils, keys, and the like, can fall through the desktop.

Attempts to overcome these problems have led to the development of cable management grommets such as those disclosed in the U.S. Pat. Nos. 4,688,491, 4,730,363, 4,808, 774, 4,950,839 and 5,167,047. When installed in a hole through a desktop, these grommets provide a finished appearance to the surface and seal the hole so that objects can not fall through. These non-adjustable grommets typically employ a sliding panel or a hinged lid which may be placed in either a completely open position—when cabling is installed—or a completely closed position—when no cabling is installed. One major drawback of these grommets is that, while they effectively seal the hole in the surface when in the closed position, they often leave an excessively large opening when only one or a few cables are installed. In an attempt to eliminate this problem, grommets have been developed that have an adjustable sliding panel which can be slid against the cabling after it is installed, thus reducing excessive opening space. However, one problem with these adjustable grommets is that movement of installed cabling can cause inadvertent expansion of the grommet opening leaving a path where small objects can fall through the desktop. A further drawback of all existing non-adjustable grommets is that they must be partially or completely removed from the surface in which they are installed when cabling is added to, or removed from, the arrangement. This is a particularly acute problem when the user wishes to add or remove a cable which has a large plug at one end of the cable. Even in virtually all adjustable grommets, which have adjustable openings to snugly accommodate cables, at least part of the grommet must be removed when installing, or removing cabling, so that the plug of the cable may be passed through the grommet.

There is presently one grommet design which employs a pivotably-mounted, adjustable lid through which plugged cables can be installed without removing any part of the grommet from the working surface. This grommet is disclosed in U.S. Pat. No. 4,950,839. However, this design does not operate entirely within the perimeter of a single working surface, and thus, can't function at all in the absence of a second surface abutting the edge of the surface in which it is installed.

Thus, to date, no cable management grommet which fits entirely within the perimeter of a working surface can receive plugged cabling without, at least, partial removal of the grommet, and can also be adjusted to accommodate installed cabling with a minimum of excessive opening space.

SUMMARY OF THE INVENTION

It is, accordingly, an object of the present invention to provide an adjustable cable management grommet for routing cables through a surface which fits entirely within the perimeter of that surface, and allows for the addition and removal of plugged cables without removing any portion of the grommet from the surface in which it is installed.

It is another object of the invention to provide an adjustable cable management grommet with an opening which is adjustable over a wider range of opening sizes to accommodate various cable arrangements with an overall larger cross-sectional area.

It is yet another object of the invention to provide an adjustable cable management grommet which can be adjusted to a plurality of discrete positions, with corresponding discrete opening sizes, to minimize the possibility of inadvertent enlargement of the opening due to, for example, movement of previously installed cables.

It is a further object of the invention to provide an adjustable cable management grommet which provides an optimal combination of (1) a finished appearance; (2) an adjustable opening to snugly accommodate cabling; and (3) simple adjustment of the grommet opening for quick and easy addition and removal of cabling.

These and other objects and advantages of the invention are provided in one embodiment by forming an adjustable cable management grommet having a grommet body with a substantially cylindrical shell and a wall at one end thereof, and a rotatably mounted cover. The circular cover can be rotated such that an aperture in the grommet body wall and an aperture in the cover can be aligned to define an adjustable opening for adding or removing plugged cables, and then rotated again to close the grommet opening. The cover is snap fit into the wall at the center of the wall to define an axis of rotation for the cover at the axis of the cylindrical shell. Both the wall and cover have apertures which are substantially sector-shaped and, when aligned, define a substantially sector-shaped opening for routing plugged cabling.

The present invention offers a wider range of adjustability than other grommets described in the background portion of the specification. While a number of grommets are capable of varying the size of the opening through which cabling is passed, others are only capable of being either fully opened or fully closed. Of those capable of variable sized opening, the range of variability is relatively small. Thus, the number of cables which may be routed through the adjustable opening, and the size of those cables, is necessarily circumscribed. On the other hand, the present invention is capable of creating an opening of up to approximately fifty percent of the entire surface area of the grommet body wall. Thus, the present invention can accommodate cable arrangements with an overall larger cross-sectional area than other existing grommets.

An additional advantage of the present invention over the grommets discussed above is that it offers the use a plurality of discrete opening sizes to choose from. Since electronic office equipment is occasionally moved about the desktop, the accompanying wire movement which occurs can cause the openings on other adjustable grommets to expand. Each time this occurs, the user must readjust the grommet opening to remove any excessive opening space which may be present so that small objects cannot fall through the desktop. In contrast, while some embodiments of the present invention provide the user with a continuum of sizes to chose from, other embodiments offer a plurality of discrete opening sizes to choose from. Since each discrete opening size is secured by the mating of male detents with female dimples in snap fit fashion, the opening is resistant to undue slippage due to wire movement. However, if the user desires, he may still select any of the other opening sizes by merely rotating the cover with a single finger from above the working surface.

Another significant advantage relative to the grommets mentioned above is simplified adjustability. To route a plugged cable through a surface using other grommets, the user must (1) partially or completely remove the grommet from the surface in which it is installed; (2) create an opening in the grommet by flipping a lid, sliding a panel, or by some other means; (3) pass the cabling through the grommet opening; (4) replace the grommet with the installed cabling into the surface; and (5) for adjustable grommets, adjust the panel or lid of the cover so that the opening is approximately commensurate with the cross-sectional area of the installed cabling. By contrast, the present invention allows a user to route plugged cables through the grommet while it is still completely installed in a desktop by adjusting the grommet cover with a single finger from above the desktop. The user need only (1) rotate the cover in either direction until the apertures in the grommet body wall and the cover are aligned to define an opening sufficient to pass the plugged cabling; (2) pass the cabling through the opening; and (3) rotate the cover in either direction until the opening is approximately commensurate with the cross-sectional area of the installed cabling.

BRIEF DESCRIPTION OF THE DRAWINGS

The preferred embodiment of the invention will be described below with reference to the accompanying drawings where like numerals represent like structure, and where:

FIG. 4a is a perspective view of the underside of the grommet shown in FIG. 3a; and FIG. 4b, is an enlarged perspective view of the central portion of the underside of the grommet shown in FIG. 4a.

DESCRIPTION OF THE PREFERRED EMBODIMENT

Figure 1:
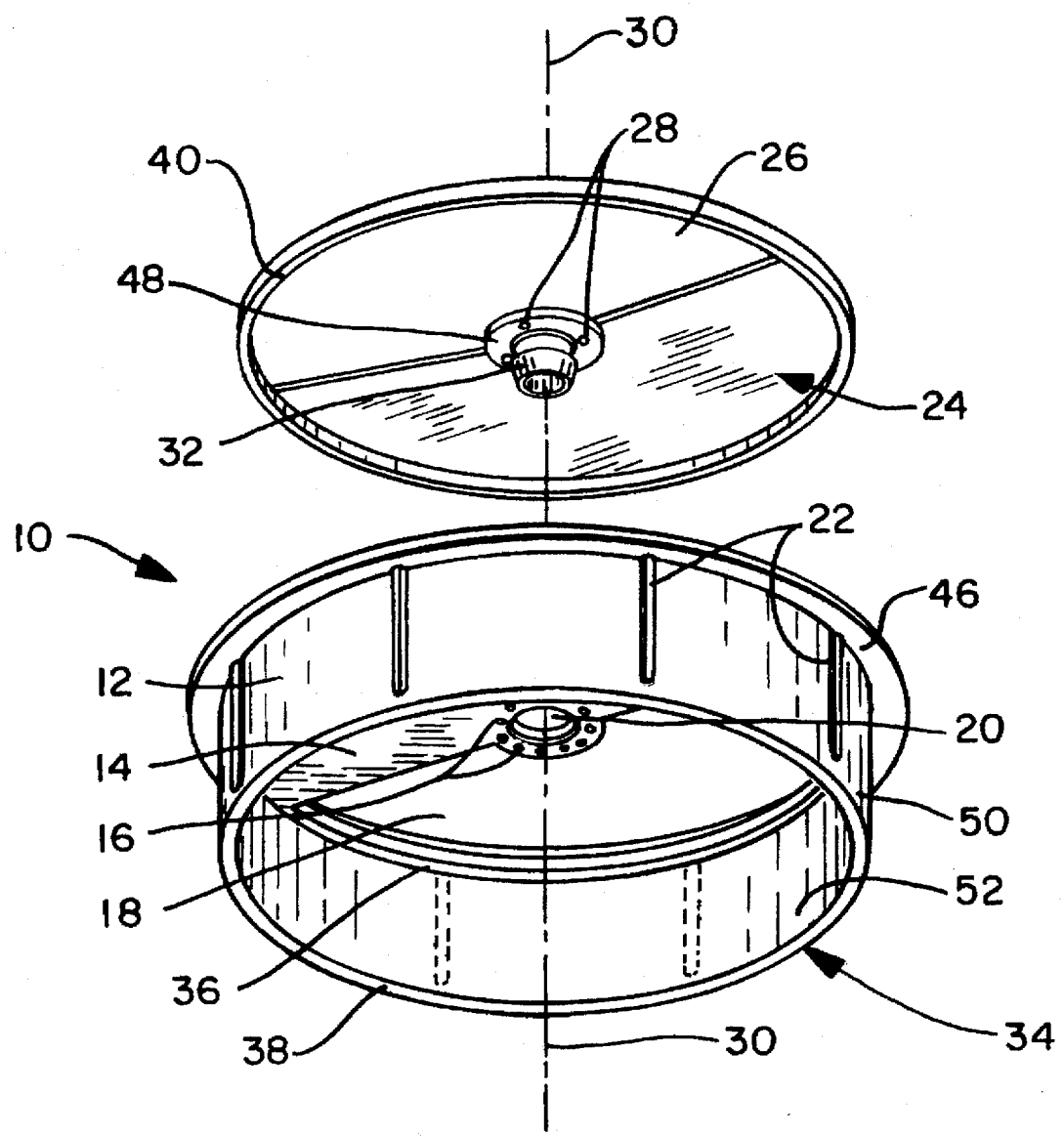
FIG. 1 is an exploded/perspective view of the underside of the preferred grommet of the present invention.
Figure 2:
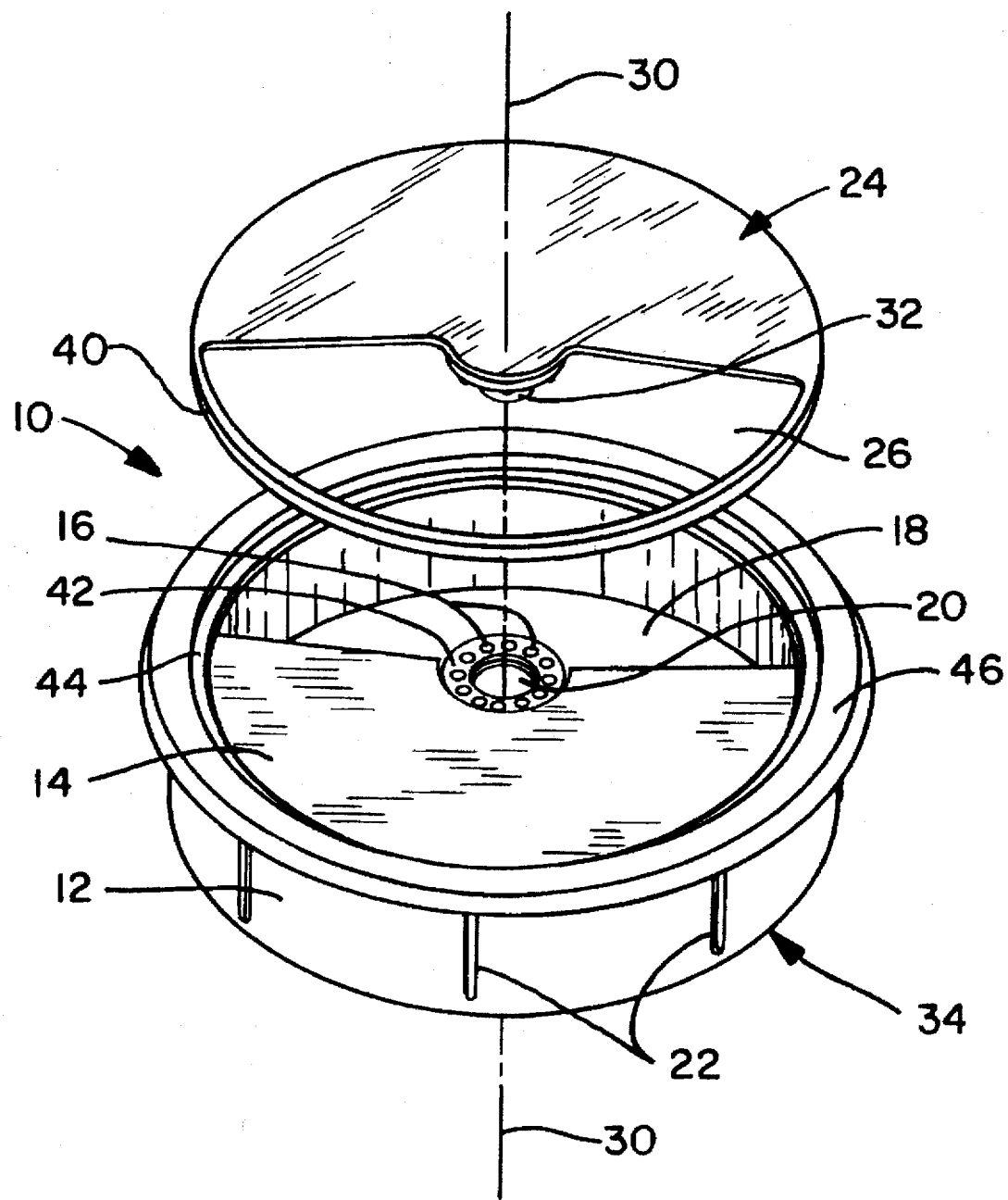
FIG. 2 is an exploded/perspective view of the upper side of the grommet shown in FIG. 1.

FIGS. 1 and 2 show a cable management grommet 10 in accordance with one embodiment of the invention. The grommet 10 has an integrally formed grommet body 34 and an integrally formed cover 24, both of which can be made of either plastic or metal. Grommet body 34, as shown, has a substantially cylindrical shell 12 with opposed ends 36, 38, a substantially planar wall 14 at end 36 with a flange 46 extending beyond the diameter defined by an outer surface 50 of shell 12 at the perimeter of wall 14. Projecting from outer surface 50 of shell 12 are a plurality of ribs 22, extending in a direction substantially parallel to an axis 30, which ensures a snug interference fit between grommet 10 and a hole through a working surface when grommet 10 is inserted into a hole of approximately the same diameter as outer surface 50 of shell 12. Preferably, the number of ribs 22 is in the range of between about 1 and 20. The ideal number of ribs 22 is 8.

Wall 14 is substantially circular and has a diameter slightly larger than the diameter of outer surface 50 of shell 12 such that wall 14 and outer surface 50 cooperating define flange 46. When grommet 10 is installed in a working surface, flange 46 ensures that grommet 10 seats flush with the working surface. Wall 14 further consists of a substantially sector-shaped first aperture 18, a substantially circular recessed lip 44, concentric with axis 30, near the perimeter of wall 14, and a recessed area 42 at the center of wall 14. Recessed area 42 contains a substantially circular second aperture 20, concentric with axis 30, and a plurality of dimples 16 arranged in a circular pattern around aperture 20 and concentric with axis 30. Preferably, the number of dimples is in the range of between about 4 and 16. The ideal number of dimples 16 is 12.

The integrally formed, substantially circular grommet cover 24 has a substantially circular rim 40 at the perimeter of cover 24, a substantially sector-shaped first aperture 26 and an elevated region 48. Elevated region 48 contains a substantially cylindrical protrusion 32, concentric with axis 30, and a plurality of detents 28 arranged in a circular pattern about protrusion 32 and concentric with axis 30. The preferred number of detents 28 is in the range of between about 1 and 8. The ideal number of detents 28 is 4. When assembled, cover 24 mounts onto grommet body 34 to form grommet 10 such that: (1) the elevated region 48 of cover 24 engages the recessed area 42 of body 34; (2) the rim 40 of cover 24, engages the lip 44 of body 34; (3) the protrusion 32 of cover 24 mates in snap fit fashion with the second aperture 20 of body 34; and (4) the plurality of detents 28 of cover 24 mates in snap fit fashion with an equal number of dimples 16 of body 34, As cover 24 is rotated relative to body 34 about axis 30, detents 28 of cover 24 successively engage and disengage dimples 16 of body 34 to define a plurality of discrete opening sizes corresponding to the overlap of first aperture 26 of cover 24 and first aperture 18 of wall 14.

Figure 3A:
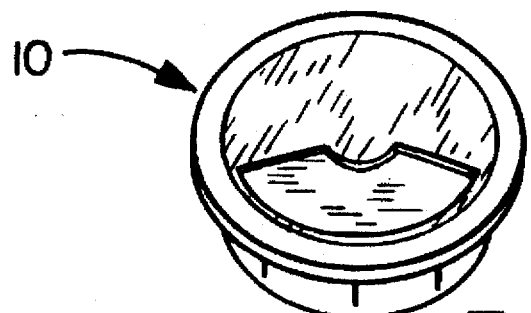
FIGS. 3a, 3b, 3c and 3d are perspective views of the upper side of the grommet shown in FIG. 1, in the fully closed, partially opened, more fully opened, and fully opened positions respectively.
Figure 3B:
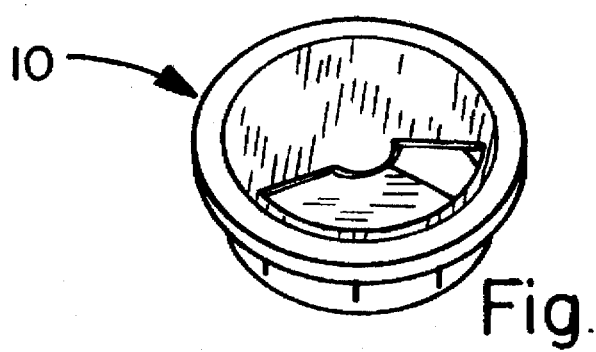
Figure 3C:
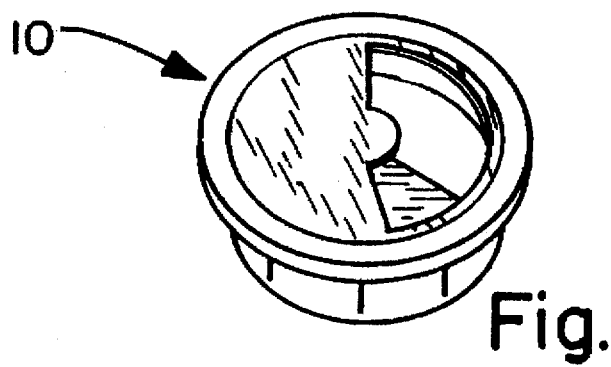
Figure 3D:
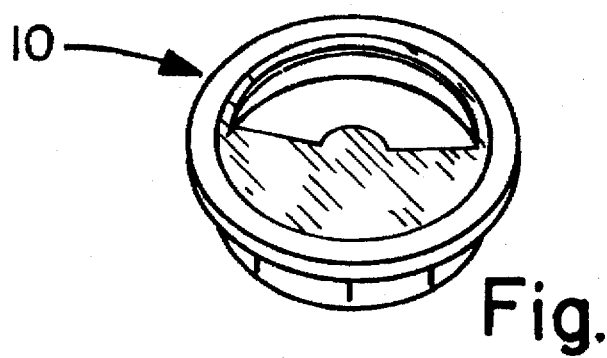

FIGS. 3a, 3b, 3c and 3d show grommet 10 as described with respect to FIGS. 1 and 2, with cover 24 positioned to define four successively larger discrete opening sizes. FIG. 3a shows grommet 10 in the fully closed position. This is the position grommet 10 would normally be in when no cabling is installed. FIGS. 3a and 3b show grommet 10 in two partially opened positions. FIG. 3d shows grommet 10 in the fully opened position. This corresponds with maximum alignment of first aperture 18 of body 34 and the first aperture 26 of cover 24.

Figure 4A:
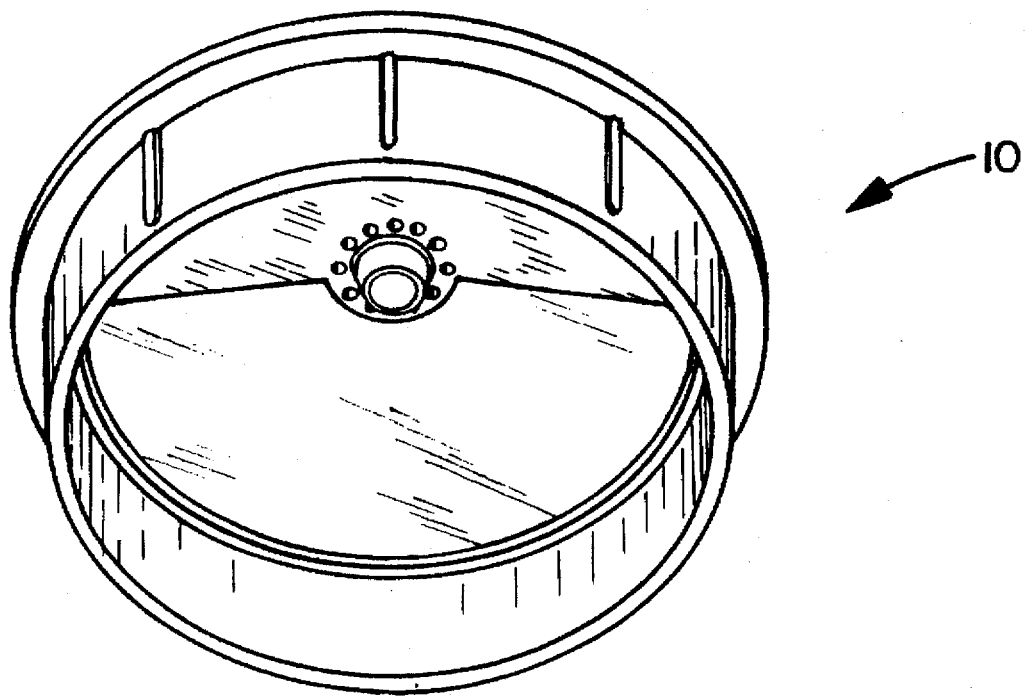
Figure 4B:
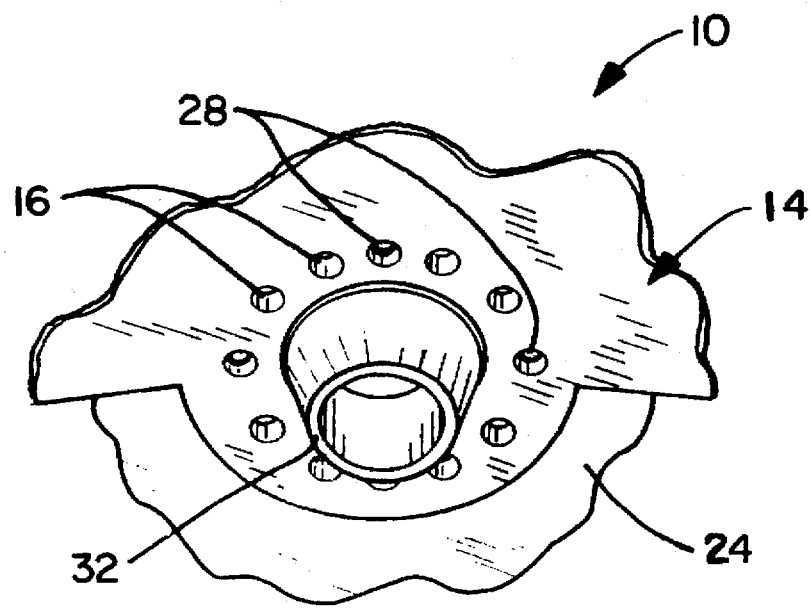

FIG. 4a shows the underside of grommet 10, as described with respect to FIGS. 1 and 2, in the fully closed position. FIG. 4b is an enlarged view of the central portion of grommet 10 as shown in FIG. 4a. As shown in FIG. 4b, when body 34 is assembled with cover 24, detents 28 are mated in snap fit fashion with an equal number of dimples 16.

What is claimed is:

1. An adjustable cable management grommet for routing cables through a surface comprising:

a body having a substantially cylindrical shell with opposed ends and a wall at at least one end of said shell, said wall cooperating with said shell to define at least a first aperture for routing cables;

a cover rotatably mounted on said body for selectively blocking said first aperture by rotation of said cover about an axis of rotation which is generally perpendicular to said wall; and wherein one of said wall and said cover includes a plurality of male detents, and wherein the other of said wall and said cover includes a plurality of female dimples, at least some of which successively engage said detents when said cover is rotated.

2. An adjustable cable management grommet for routing cables through a surface as recited in claim 1, wherein the number of said detents is in the range of between about 1 and 8.

3. An adjustable cable management grommet for routing cables through a surface as recited in claim 1, wherein the number of said dimples is in the range of between about 1 and 15.

4. An adjustable cable management grommet for routing cables through a surface as recited in claim 1, wherein one of said wall and said cover includes a second aperture located at the center of said wall or said cover, and wherein the other of said wall and said cover includes a protrusion which concentrically engages said second aperture to thereby define said axis of rotation; and said shell has an inner surface and an outer surface, and wherein a plurality of ribs are located on said outer surface of said shell extending in a direction substantially parallel to said axis of rotation.

5. An adjustable cable management grommet for routing cables through an aperture situated entirely within the perimeter of a generally planar surface of a piece of furniture, said grommet comprising;

a body having a shell with opposed ends and a wall at at least one end of said shell, said wall cooperating with said shell to define at least a first aperture for routing cables, said shell being sized and shaped to be snugly received within the surface aperture and said first aperture being coplanar with the surface aperture when said shell is received within the surface aperture;

a cover rotatably mounted on said body for selectively blocking said first aperture by rotation of said cover about an axis of rotation which is generally perpendicular to said wall; and wherein one of said wall and said cover includes a plurality of male detents, and wherein the other of said wall and said cover includes a plurality of female dimples at least some of which successively engage said detents when said cover is rotated.

6. An adjustable cable management grommet as recited in claim 5, wherein said first aperture of said cover is substantially sector-shaped, and wherein the size of said first aperture of said cover is defined by sweeping a radius across an angle in the range of between about 1° and 180°.

7. An adjustable cable management grommet as recited in claim 5, wherein said shell is a substantially cylindrical shell, and wherein said cover is substantially circular and includes at least a first aperture which can be rotatably aligned with said first aperture of said wall to define an opening for routing the cables;

wherein one of said wall and said cover includes a second aperture located at the center thereof, and wherein the other of said wall and said cover includes a protrusion which concentrically engages said second aperture and defines an axis of rotation wherein said shell has an inner surface and an outer surface; and wherein a plurality of ribs are located on said outer surface of said shell extending in a direction substantially parallel to said axis of rotation.

8. A method of routing a cable, of a type having a cross-section, through a surface aperture situated entirely within the perimeter of a surface, said method comprising the steps of:

providing an adjustable cable management grommet having a body with opposed ends and a wall at at least one of said ends, the wall defining at least a cable-routing aperture, the grommet also having a rotatably mounted cover which cooperates with the wall to selectively block the cable-routing aperture;

installing the grommet in the surface aperture;

firstly rotating the cover about a rotation axis which is generally perpendicular to the wall until the cover cooperates with the wall to define an opening sufficiently large to pass the cable therethrough;

passing the cable through the opening; and secondly rotating the cover about the rotation axis until the opening is generally commensurate with the cross-section of the cable passing therethrough.

9. The method of claim 8, wherein said step of firstly rotating the cover about a rotation axis includes symmetrically rotating the cover about a rotation axis in a first direction and wherein said step of secondly rotating the cover about the rotation axis includes symmetrically rotating the cover about the rotation axis in an opposite direction to the first direction.

10. The method of claim 8, wherein said step of providing includes providing the cover with means defining a first sector-shaped aperture which can be aligned with the cable-routing aperture to define an opening for routing the cable and wherein said step of firstly rotating the cover about a rotation axis includes aligning the first sector-shaped aperture with the cable-routing aperture.

11. The method of claim 10, wherein said step of firstly rotating the cover about a rotation axis includes rotating the cover until the opening assumes one of a plurality of discrete opening sizes, and wherein said step of secondly rotating the cover about the rotation axis includes rotating the cover until the opening assumes one of a plurality of discrete opening sizes.

* * * * *